F. V. RISINGER.
SHOCK ABSORBER.
APPLICATION FILED OCT. 14, 1916.
1,223,422. Patented Apr. 24, 1917.
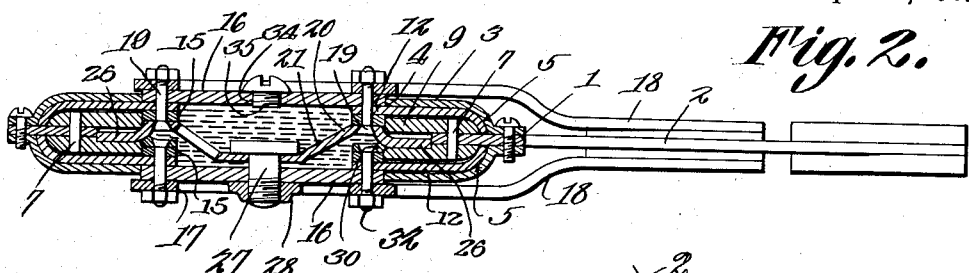
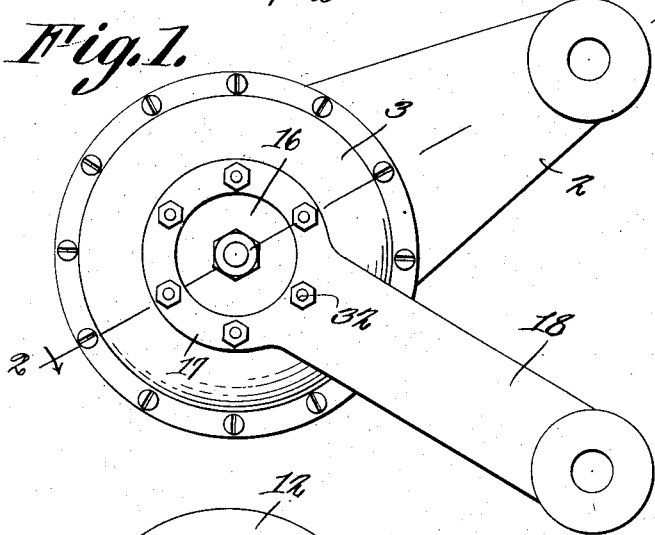
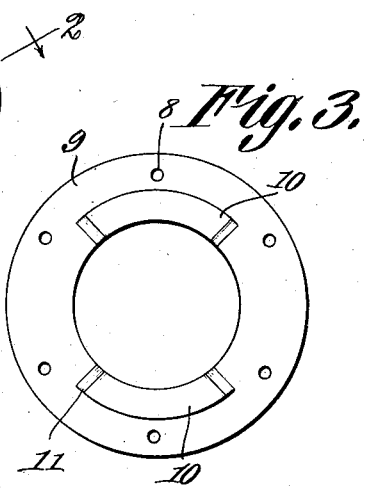
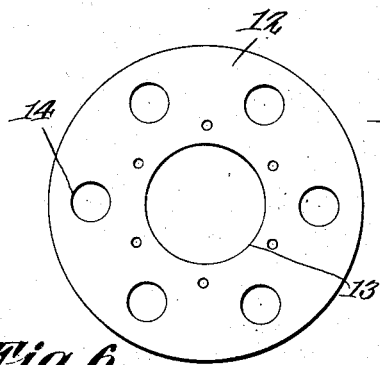
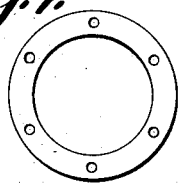
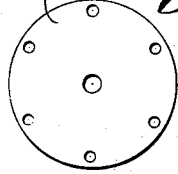
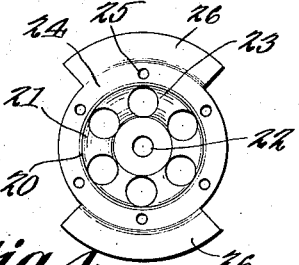
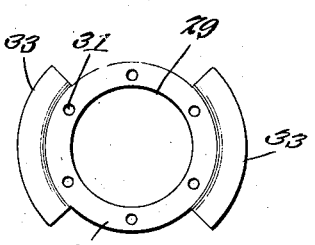
Witnesses
F. V. Risinger, Inventor,
by C. A. Snow & Co.
Attorneys.

UNITED STATES PATENT OFFICE.

FRANK V. RISINGER, OF YOUNGSTOWN, OHIO, ASSIGNOR TO THE BLOCK GAS MANTLE CO., OF YOUNGSTOWN, OHIO.

SHOCK-ABSORBER.

1,223,422.  Specification of Letters Patent.  Patented Apr. 24, 1917.

Application filed October 14, 1916. Serial No. 125,667.

*To all whom it may concern:*

Be it known that I, FRANK V. RISINGER, a citizen of the United States, residing at Youngstown, in the county of Mahoning and State of Ohio, have invented a new and useful Shock-Absorber, of which the following is a specification.

This invention relates to shock absorbers for use in connection with automobiles and other vehicles, one of its objects being to provide a simple, compact and inconspicuous device of this character which can be applied readily to a vehicle and which does not utilize springs or fluids as retarding mediums but, instead, is dependent upon frictional resistance to retard the relative movement of the parts to which the device is attached.

A further object is to provide a device of this character which allows limited unrestricted movement of the vehicle body and which only comes into action for the purpose of absorbing the shock, when more than the allowed movement takes place.

Another object is to provide simple and efficient means whereby the shock absorber can be adjusted to increase or reduce the resistance offered thereby to the relative movement of the parts to which it is attached.

A further object is to provide a structure of this character which can be easily lubricated and the working parts of which are constantly protected from dust and moisture.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a side elevation of a shock absorber embodying the present improvements.

Fig. 2 is a section on line 2—2 Fig. 1.

Fig. 3 is a detail view of one of the friction rings.

Fig. 4 is a detail view of one of the spreading disks.

Fig. 5 is a detail view of the other spreading disk.

Fig. 6 is a detail view of one of the friction disks.

Fig. 7 is a detail view of a filling ring.

Fig. 8 is a detail view of a closure plate.

Fig. 9 is a section through a portion of a slightly modified form of shock absorber.

Referring to the figures by characters of reference 1 designates a central ring having an integral outstanding arm 2. This ring is interposed between friction plates 3 each of which has a central circular opening 4, while the peripheral portion of each friction plate is extended toward and bolted or otherwise secured to the central ring 1. Thus there is provided between the center ring 1 and each of the friction plates 3, an annular pocket 5. The peripheral portion of each plate 3 may be rounded as shown in Fig. 1, or, if preferred, can be bent inwardly abruptly, as shown at 6, the pocket in Fig. 9 being indicated at 5'.

The central ring 1 has a series of pins 7 extending therethrough and the ends of these pins extend loosely into openings 8 formed in friction rings 9 which normally bear against the respective sides of the ring 1 and extend into the pockets 5. The rings 9 extend partly over the central opening in the center ring 1 and the inner portion of each ring 9 has diametrically opposed segmental cams or raised portions 10 the ends of which are inclined as at 11. The two rings 9 are duplicates but they are so arranged that the cams 10 on one ring are directly opposite the spaces between the cams on the other ring. All of the cams are located opposite the central opening in the ring 1, and are capable of projecting into said opening.

Interposed between each friction ring 9 and the adjacent friction plate 3 is a friction disk 12 the peripheral portion of which is so shaped as to fit snugly between the adjoining faces of the plates 3 and the disk 9. In other words, where the peripheral portion of the plate 3 is rounded as in Fig. 1, the peripheral portion of the friction disk is likewise rounded and is adapted to fit snugly between the rounded portion of the plate 3 and the rounded periphery of ring 9. Each of the friction disks 12 has a central opening 13 and a plurality of smaller openings 14 whereby a lubricant is free to work through the disk. The opening 13 in each of the disks 12 is of less diameter than the openings in the rings 9. Resting upon the inner surface of that portion of each disk 12 projecting inwardly partly over the opening in the ring 9 is a filling ring 15 adapted to fit loosely within the opening in the friction ring 9. Fitted within the opening in each friction plate 3 is a closure plate 16. Attaching rings 17 engage and are concentric with the outer faces of the plates 16 and formed integral with these rings 17 is a forked arm 18 straddling the plates 3 as shown.

Extending through one of the rings 17 and the adjacent closure plate 16 is a series of bolts 19 which also extend through openings in the adjacent friction disk 12, the filling ring 15 on said plate, and a spreading disk 20 of novel form. This spreading disk includes a central frusto-conical portion 21 in which is formed a central opening 22 and a series of smaller openings 23 extending therearound. A flat flange 24 surrounds the frusto-conical portion and has openings 25 for the reception of the bolts 19. Offset from and extending outwardly beyond the flange 24 are diametrically opposed segmental cams 26 which project between the friction rings 9. The bolts 19 attach the spreading ring 20 to one of the closure plates 16, while an adjusting screw 27 is arranged in the opening 22 and connects said spreading disk to the other cover plate 16. This adjusting screw is engaged by a nut 28 which, when turned in one direction or the other will shift the spreading disk relative to the closure plates.

The frusto-conical portion 21 of the spreading disk 20 extends through a central opening 29 formed within a ring-like spreading disk 30 having openings 31 for the reception of bolts 32 which correspond with the bolts 19 but are extended through the disk 16 in which the screw 27 is mounted. These bolts 32 serve to attach to said disk 16 the adjacent rings 17 and 15 and the adjacent friction disk 12 as well as the spreading disk 30. The spreading disk has diametrically opposed offset portions or cams 33 which are segmental as shown. These cams are similar to the cams 26 but the two disks 20 and 30 are so disposed that the cams 33 are directly opposite the spaces between the cams 26. The cams 26 normally rest between the cams 10 on one of the rings 9 while the cams 33 normally rest between the cams 10 on the other ring 9. As each one of the cams on the rings 9 and on the disks 20 and 30 extends through less than 90° it will be obvious that when the parts are assembled the arms 2 and 18 will have a limited relative movement which will not be restrained by undue friction. The parts are so positioned relative to each other, however, that after the limit of movement has been passed, the disks 20 and 30 which are secured to and rotate with the forked arm 18 will shift between the rings 9 which are secured to and rotate with the arm 2 with the result that the cams 26 and 33 will ride between the cams 10 and exert a wedging action, thereby pressing the rings 9 outwardly and causing them to bind upon the friction disks 12 which, in turn, will be pressed against the friction plates 3. In other words, the disks 12, which move with the forked arm 18, will be tightly gripped between the rings 9 and the friction plates 3 which move with the arm 2. Thus a considerable frictional resistance will be set up with the result that excessive shocks will be absorbed. Adjustment of the parts so as to increase or reduce the frictional resistance is effected by means of the nut 28 and the screw 27. When the nut is adjusted onto the screw 27 so as to draw the disk 20 toward the plate 16 engaged by the screw, the flange 24 of disk 20 is drawn nearer to or into the plane occupied by the disk 30 (see Fig. 2), thus increasing the distance between the oppositely extending cams 26 and 33 with the result that a greater wedging action is obtained than otherwise. By unscrewing the nut 28, the disks 20 and 30 are permitted to work apart or away from each other, thus to reduce the distance between the planes occupied by the active faces of the cams 26 and 33 and, consequently, reduce the spreading action and the frictional resistance resulting therefrom.

An aperture 34 may be provided within one of the closure plates 16 for the reception of a lubricant and this aperture may be normally closed by a screw plug 35 or the like. The lubricant is adapted to be contained within the casing formed by the plates 16 and friction plates 3 and will work through the apertures in disk 20 and also through the apertures in the friction disk 12. Thus all of the parts of the mechanism will be kept constantly lubricated so as to remain noiseless in operation and at the same time the working parts will be fully protected from dust and moisture.

What is claimed is:—

1. A shock absorber including pivotally connected relatively movable members, friction plates revoluble with one of the members, laterally movable friction rings revoluble with said member, a friction disk interposed between each ring and one of the friction plates and revoluble with the other member, and wedging means interposed between the friction rings.

2. A shock absorber including pivotally connected relatively movable members, friction plates revoluble with one of the members, laterally movable friction rings revoluble with said member, a friction disk interposed between each ring and one of the friction plates and revoluble with the other member, wedging means interposed between the friction rings and movable with the friction disks.

3. A shock absorber including pivotally connected relatively movable members, friction plates revoluble with one of the members, laterally movable friction rings revoluble with said member, a friction disk interposed between each ring and one of the friction plates and revoluble with the other member, wedging means interposed between the friction rings and movable with the friction disks, and means upon the friction rings normally out of engagement with but adapted, during excessive relative movement to engage the spreading means.

4. A shock absorber including pivotally connected members, opposed friction plates movable with one of the members, interposed laterally movable friction rings movable with said member, friction disks interposed between the rings and plates and movable with the other member, and adjustable spreading means interposed between the friction rings.

5. A shock absorber including pivotally connected members, opposed friction plates movable with one of the members, interposed laterally movable friction rings movable with said member, friction disks interposed between the rings and plates and movable with the other member, adjustable spreading means interposed between the friction rings, and means carried by the friction rings and normally disengaged from the spreading means for moving into engagement with said spreading means during excessive relative movement of the pivoted members to shift the rings laterally into frictional engagement with the friction disks.

6. The combination with pivotally connected members, opposed friction plates movable therewith, and laterally shiftable friction rings movable with one of said members and interposed between the plates, of friction disks interposed between the rings and plates and movable with the other member, segmental cams upon the inner faces of the rings and spaced apart, disks extending between and movable relative to the friction rings, and spreading cams upon said interposed disks and normally disposed in the spaces between the cams upon the friction rings, said cams being movable into frictional engagement during excessive relative movement of the pivotally connected members to shift the friction rings apart and frictionally engage the friction disks.

7. The combination with pivotally connected members, opposed friction plates movable therewith, and laterally shiftable friction rings movable with one of said members and interposed between the plates, of friction disks interposed between the rings and plates and movable with the other member, segmental cams upon the inner faces of the rings and spaced apart, disks extending between and movable relative to the friction rings, spreading cams upon said interposed disks and normally disposed in the spaces between the cams upon the friction rings, said cams being movable into frictional engagement during excessive relative movement of the pivotally connected members to shift the friction rings apart and frictionally engage the friction disks, and means for adjusting the interposed disks relative to each other to vary the distance between the planes of the active faces of the cams upon said disks.

8. In a shock absorber the combination with pivotally connected members, of opposed friction plates connected to and movable with one of the members, interposed friction rings revoluble with said member and movable laterally toward the friction plates, closure plates movable with the other member and coöperating with the friction plates to form a casing, friction disks revoluble with the closure plates and interposed between the friction plates and the friction rings, and spreading means housed within the casing and interposed between the friction rings.

9. In a shock absorber. the combination with pivotally connected members, of opposed friction plates connected to and movable with one of the members, interposed friction rings revoluble with said member and movable laterally toward the friction plates, closure plates movable with the other member and coöperating with the friction plates to form a casing, friction disks revoluble with the closure plates and interposed between the friction plates and the friction rings, disks within the casing and interposed between the friction rings, and coöperating normally disengaged means upon the interposed disks and the friction rings for spreading the friction rings apart during excessive relative movement of the pivotally connected members.

10. In a shock absorber, the combination with pivotally connected members, of opposed friction plates connected to and movable with one of the members, interposed friction rings revoluble with said member and movable laterally toward the friction plates, closure plates movable with the other member and coöperating with the friction plates to form a casing, friction disks revoluble with the closure plates and interposed between the friction plates and the friction rings, disks within the casing and interposed between the friction rings, coöperating normally disengaged means upon the interposed disks and the friction rings for spreading the friction rings apart during excessive relative movement of the pivotally connected members, and means for adjusting the interposed rings relative to each other to increase or reduce the spreading action thereof.

In testimony that I claim the foregoing as my own, I have hereto affixed my signature in the presence of two witnesses.

FRANK V. RISINGER.

Witnesses:
 HARRY E. VREELAND,
 MARGARET HALLORAN.